United States Patent

Korpan et al.

(10) Patent No.: US 7,841,382 B2
(45) Date of Patent: Nov. 30, 2010

(54) APPARATUS FOR COOLING COMPONENTS IN SPACECRAFT

(76) Inventors: Nikolai Korpan, Kinderspitalgasse 10/14, A-1090 Vienna (AT); Jaroslav Zharkov, A/C 376/7, 252146 Kiew (UA); Volodymyr Leshchenko, Layosha Gavro Strasse 1a/204, 04211 Kyiw (UA)

(*) Notice: Subject to any disclaimer, the term of this patent is extended or adjusted under 35 U.S.C. 154(b) by 285 days.

(21) Appl. No.: 12/081,577

(22) Filed: Apr. 17, 2008

(65) Prior Publication Data

US 2009/0071629 A1 Mar. 19, 2009

Related U.S. Application Data

(63) Continuation of application No. 10/502,777, filed on Sep. 13, 2004, now abandoned.

(30) Foreign Application Priority Data

Jan. 29, 2002 (AT) .............................. A 142/2002

(51) Int. Cl.
*B64G 1/50* (2006.01)
(52) U.S. Cl. ............... 165/41; 165/86; 165/104.26; 165/104.27; 165/104.33; 165/185; 62/239; 62/259.2; 144/171.8
(58) Field of Classification Search ............... 62/239, 62/259, 2, 299; 165/41, 86, 104.26, 104.27, 165/185, 104.33; 244/163, 171.8; 606/24
See application file for complete search history.

(56) References Cited

U.S. PATENT DOCUMENTS

| 3,489,203 | A | * | 1/1970 | Fischell | 165/274 |
| 3,666,566 | A | * | 5/1972 | Paine | 136/202 |
| 4,324,375 | A | | 4/1982 | O'Neill | |
| 4,411,516 | A | * | 10/1983 | Adachi et al. | 355/67 |
| 4,846,264 | A | * | 7/1989 | Hata | 165/104.27 |
| 5,117,901 | A | | 6/1992 | Cullimore | |
| 5,494,241 | A | | 2/1996 | Poulain | |
| 5,588,300 | A | * | 12/1996 | Larsson et al. | 62/3.61 |
| 5,699,982 | A | | 12/1997 | Daugherty | |
| 6,276,144 | B1 | | 8/2001 | Marland et al. | |

FOREIGN PATENT DOCUMENTS

| DE | 4344025 | 6/1995 |
| EP | 0780301 | 6/1997 |
| EP | 0870677 | 10/1998 |

OTHER PUBLICATIONS

J.R. Samson et al., "Thermal Management for High Performance Computing in Spaceborne Applications" in 2000 Inter Society Conf. on Thermal Phenomena, May 23, 2000, pp. 247-254.

* cited by examiner

*Primary Examiner*—John K Ford
(74) *Attorney, Agent, or Firm*—Dykema Gossett PLLC

(57) ABSTRACT

The invention relates to an apparatus for cooling components in spacecraft, comprising a heat radiator (5) and a heat conductor (3; 3a, 3b). A versatile applicability is achieved in such a way that the heat conductor (3, 3a, 3b) penetrates an outside wall (1) of the spacecraft and is provided in the interior of the spacecraft with several coupling places (8) for components to be cooled (20) and/or for other heat conductors (10).

13 Claims, 1 Drawing Sheet

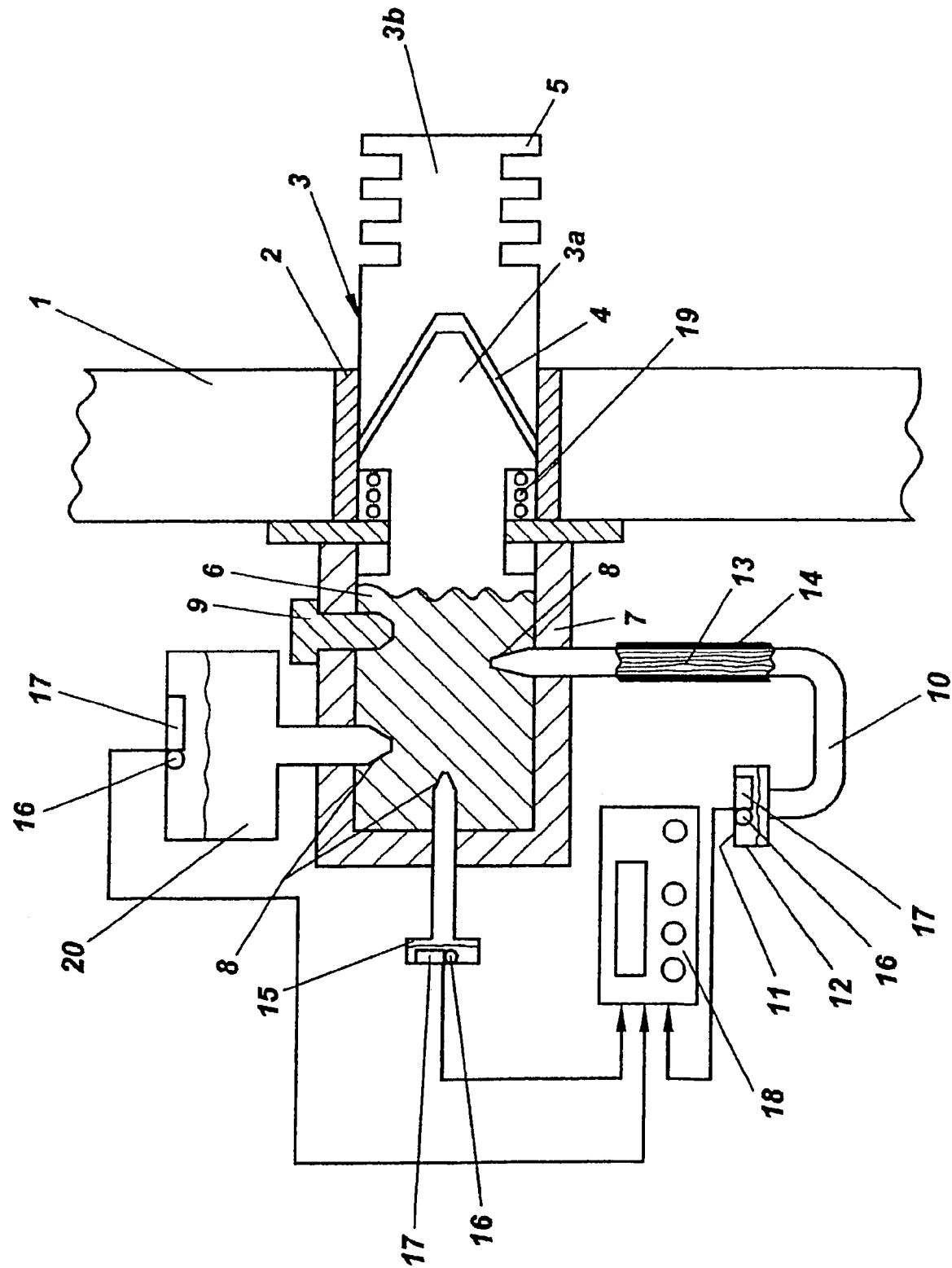

APPARATUS FOR COOLING COMPONENTS IN SPACECRAFT

BACKGROUND OF THE INVENTION

1. Field of the Invention

The invention relates to an apparatus for cooling components in space flight bodies, comprising a heat radiating body and a heat conducting body.

2. Prior Art

The research of space is one of the most predominant tasks of man from the planet earth. This task will increase in importance particularly for future generations of manhood, because as a result of newly made findings from space research man can profit not only due to new technologies but also due to the newly created spheres of living and the exploration of the unknown, mysterious and enigmatic.

The duration of flights into space with astronauts and other living beings, in conjunction with their stay in space, can extend in future to several earth years. Moreover, individual trips of tourists and interested persons may later be a part of daily life. The provision of effective medical and surgical help and diagnosis for travelers into space will therefore become a global problem. A system and a technology, tailored specifically for space and medicine, needs to be developed and adapted for this purpose. Cosmic medicine differs from conventional medicine on earth in respect of the following aspects:

In the state of zero gravity illnesses progress with their own specific properties, which is why specific diagnostic and treatment methods are gradually coming to light.

For this purpose it is necessary to create a new efficient medical technology which is adapted for space.

Since dimensions such a weight, volume and other technical parameters of space station equipment, including the medical technology, play a special role, they need to be adapted accordingly, i.e. they need to be reduced, minimized and optimized.

The ambient conditions of space need to be utilized in an optimal way such as the use of solar energy by means of solar batteries for the supply with energy of the space station. Moreover, other physical factors of space such as the cosmic cold which is also a property of space and is approx. −273° C. must be used for the proper operation of both the space station as well as the cosmic devices within the station itself, including the electrical and medical technology and the provision of living conditions for the travelers.

As is generally known, low temperatures are already highly used in our time in modern electron and medical technology. Low temperatures are produced on earth by means of refrigerating machines, liquid gases and other heat-absorbing methods in order to use them in practice. A high input of energy is required for this purpose. During the trip through space there is deep coldness outside of the space station. For this reason it is possible to develop new methods and a concomitant respective technology for heat absorption directly from the inside to the outside by various objects within the space station. The heat absorption can be dosed. The following objects can be used for the dosed heat absorption:

Elements of electronic devices (processors, receiving and master control devices of the system for remote cosmic connections, etc.) which are a component of the onboard system of the space station and various research devices.

Medical technology and surgeries for hypothermia as well as cryomedical technology or cryosurgical and cryotherapeutical surgeries (miniature operating theaters) which may allow the optimal use of the cold in the treatment of various illnesses during the trip through space. The use of hypothermia, cryotherapy and refrigerating engineering and cryotechnology will become an unquestioned advantage in comparison with alternative methods and will lead not only with respect to medical differentiation to a high accessibility and possibility for the application of cold in the space station and its equipment.

Cosmic ice chambers for the long-term storage of foodstuffs. Cosmic cryopreservation allows avoiding the use of preservatives. Foodstuffs can thus maintain their high quality during storage.

Cosmic refrigerating chambers offer the long-term storage of pharmaceuticals, viruses and other biological objects.

Cosmic cryochambers for the long-term storage of cryologically preserved items and other biological objects (e.g. blood components, cells, tissue and other biological components).

From U.S. Pat. No. 5,699,982 A, a spacecraft is known which is provided with heat radiating bodies which discharge the heat which is produced by transmitting and receiving devices on board. So-called heat pipes are used to ensure heat transportation.

DE 43 44 025 C1 describes a spacecraft with a cooling unit which is an insulated box. Cooling is limited to items inside the box so that use of such cooling unit is limited. Particularly it is not possible to cool devices located in some distance from the cooling unit. EP 870 677 A shows another cooling system. However, no solution is given to the above problem.

As described above, the requirements to provide low temperatures are numerous and are also subject to certain changes in the course of a manned mission of a longer duration. A universally applicable and adaptable supply with cold cannot be achieved with the systems known to date.

It is the object of the present invention to avoid such disadvantages and to further develop the apparatus of the kind mentioned above in such a way that a plurality of different devices and applications can be supplied with low temperatures. Special emphasis shall be placed on the flexibility in a spatial and temporal respect as well as in respect to the required temperature level.

SUMMARY OF THE INVENTION

It is provided in accordance with the invention that the heat conducting body penetrates an outside wall of the spacecraft and is provided in the interior of the spacecraft with several coupling positions for components to be refrigerated and/or for further heat conducting bodies. The solution in accordance with the invention provides a universally applicable cryogenic system which can easily be adapted to the respective requirements. The coupling places allow the simultaneous supply of different devices.

It is particularly appropriate when the heat conducting body is designed in two parts. In particular, the connection should be disposed between an outside part of the heat conducting body and an inner part of the heat conducting body in the zone of the spacecraft's outside wall. This allows providing the ideal adaptation of the heat conducting body to the conditions in space on the one hand and to the conditions in the interior of the spacecraft on the other hand.

A particularly favorable heat transmission is achieved in this connection in such a way that the connection between the outer part of the heat conducting body and the inner part of the heat conducting body is provided with a substantially conical arrangement. It is particularly preferable in this respect when the connection between the outside part of the heat conducting body and the inside part of the heat conducting body is pretension by a spring.

A further improvement of the heat transmission is achieved when the connection between the outer part of the heat conducting body and the inner part of the heat conducting body is provided with fluid of high heat conductivity. Such a heat conducting paste which is respectively suitable for low-temperature applications compensates the unevenness of any mutually touching parts.

In a further preferred embodiment of the present invention it is provided that the coupling places of the heat conducting body are arranged as closeable openings in an insulation layer which encloses the heat conducting body. Devices can thus be simply plugged into our out of the apparatus, which considerably simplifies modifications or other changes.

It can further be provided for the improvement of the heat transmission and for avoiding losses that the heat conducting body is provided with a liquid-filled hollow space. The liquid is preferably chosen in such a way that during operation it boils at one end of the hollow space and condenses at the other end. A particularly effective heat transport can be achieved by so-called heat pipes.

Heat transport can occur alternatively in such a way that the heat conducting body is substantially made of copper. Preferably, high-purity oxygen-free copper is used for this purpose. The further heat conducting bodies can be made similarly of copper wires.

The invention is now explained in closer detail by reference to the embodiment shown in the drawing.

BRIEF DESCRIPTION OF THE FIGURE

The FIGURE shows the apparatus in a sectional view.

DETAILED DESCRIPTION OF THE PREFERRED EMBODIMENT

The outside wall of a spacecraft (not shown in greater-detail) is designated in FIG. 1 with reference numeral 1. A sealing brush 2 is situated in the outside wall 1 in which a heat conductor 3 is received in an insulated and sealed way. The heat conductor 3 consists of an inner part 3a and outer part 3b which are connected at a conical connecting section 4 in a favorable heat conducting manner by using a heat conducting paste. Heat radiators 5 are attached to the outer part 3b of the heat conductor 3 which are arranged in this case in the form of cooling ribs.

The part 6 of the heat conducting body 3 which is situated in the interior of the space craft is provided with a respective insulating layer 7 in order to avoid heat losses. Furthermore, the part 6 includes several coupling places 8 for components to be refrigerated or the like which, when not in use, can be closed off by seals 9. Further heat conductors 10 can be connected to the coupling places 8, which conductors consist of bundles of copper wire 13 and are provided on the outside with an elastic heat-insulating covering 14. The further heat conducts 10 can be provided with a working surface 11 of a working probe 12 which allows direct cryotechnical applications. A temperature sensor 16 can be provided in the working surface 11 through which the temperature is determined and which allows a precise temperature control by using a heating element 17 which is also integrated in the zone of the working surface 11. The temperature control can be realized by a respective regulator 18. The heat conductor 10 can also be provided with a heat pipe 15.

Instead of heat conductors, the components to be refrigerated could also be connected directly to the coupling places 8, such as a refrigerating chamber 20, which is also provided with a temperature sensor 16 and a heating element 17.

The apparatus in accordance with the invention can be provided with an arrangement so as to be telescopically extendible from and retractable back to the sealing bush 2 in order to avoid being an obstruction during the start or re-entry into the atmosphere. A spring 19 is used to press the two parts 3a, 3b of the heat conductor 3 against one another and to pretension the zone 4.

The apparatus in accordance with the invention is suitable for a large number of different applications and can be adapted easily to changing requirements.

The invention claimed is:

1. A combination of a spacecraft having an outer wall and a cooling apparatus for cooling components in the spacecraft, said combination comprising:
a heat radiator and a primary heat conductor, said primary heat conductor extending through said outer wall and comprising an inner part which includes a plurality of coupling sites and extends from inside the spacecraft to said outer wall, an outer part which extends from said outer wall to said heat radiator outside said spacecraft, said inner and outer parts defining a conical chamber therebetween containing a fluid of high heat conductivity, and a spring which presses the inner and outer parts together to pretension the conical chamber.

2. The combination as defined in claim 1, wherein the primary heat conductor comprises copper.

3. The combination as defined in claim 1, wherein the secondary heat conductors comprise copper wires.

4. The combination as defined in claim 3, wherein the copper wires are flexible.

5. The combination as claimed in claim 1, wherein said heat radiator comprises a plurality of spaced fins at an end of the outer part of the heat conductor located outside said spacecraft.

6. The combination as defined in claim 1, including an insulating layer covering a portion of said inner part.

7. The combination as defined in claim 6, wherein said insulation layer includes coupling holes which at least in part define said coupling sites.

8. The combinations as defined in claim 7, including a plurality of seals for closing said coupling holes.

9. The combination as defined in claim 1, including a component in said spacecraft which is directly connected to a coupling site.

10. The combination as defined in claim 9, wherein said component comprises a refrigerating chamber.

11. The combination as defined in claim 1, including a secondary heat conductor connected to a coupling site.

12. The combination as defined in claim 1, wherein said spring contacts the inner part and presses the inner part against the outer part.

13. The combination as defined in claim 1, wherein said conical chamber is located within said outer wall.

* * * * *